United States Patent [19]

Kanaoka et al.

[11] 3,891,670

[45] June 24, 1975

[54] N-(1-ANILINO NAPHTHYL-4) MALEMIDE THIOL-GROUP DETECTING REAGENT

[75] Inventors: Yuichi Kanaoka; Mikiko Machida; Minoru Machida, all of Sapporo, Japan

[73] Assignee: Yuichi Kanaoka, Tokyo, Japan

[22] Filed: Sept. 11, 1973

[21] Appl. No.: 396,320

[30] Foreign Application Priority Data
Oct. 5, 1972    Japan.............................. 47-100122

[52] U.S. Cl......... 260/326.5 FM; 424/7; 260/534 R
[51] Int. Cl.............................................. C07d 27/18
[58] Field of Search .......................... 260/326.5 FM

[56]          References Cited
         UNITED STATES PATENTS
2,686,774    8/1954    D'Alelio................ 260/326.5 FM X
3,394,145    7/1968    Bublitz...................... 260/326.5 FM

*Primary Examiner*—Joseph A. Narcavage
*Attorney, Agent, or Firm*—Scrivener Parker Scrivener & Clarke

[57]            ABSTRACT

Thiol-group detecting reagents consisting, principally, of N-substituted aminonaphthylmaleimides and process for the preparation thereof.

1 Claim, No Drawings

N-(1-ANILINO NAPHTHYL-4) MALEMIDE THIOL-GROUP DETECTING REAGENT

This invention relates to certain thiol-group detecting reagents and the processes for the preparation thereof, and more particularly to the reagents for detecting thiol groups, in particular those found in proteins, important biopolymers, by specifically reacting the thiol-groups with suitable maleimide derivatives substituted at the N atom with various aminonaphthyl groups to thereby produce highly fluorescent products and a general process for the preparation of such reagents.

For labeling proteins, peptides or amino acids with fluorescence, a method has been employed hitherto wherein a fluorescent substance is covalently bound to the target substances. Thus, for example, the fluorescent antibody technique involving labeling antibodies with fluorescence and observing the fluorescence at the site where the binding of the antibodies with the fluorescence occurs in an important immunological research procedure. In this case there has been utilized fluorescein cyanate or fluorescein isocyanate, both being fluorescent compounds, or 1-dimethylaminonaphthalene-5-sulfonic acid chloride (DNS). However, fluorescein cyanate or isothiocyanate has usually been employed for non-specific labeling. The use of 1-dimethylaminonaphthalene-5-sulfonic acid chloride (DNS) has also been directed to non-specific labeling by binding the amino groups of lysines and at N-terminals, the hydroxy groups in tyrosines and the imidazolyl groups in histidines as well as the SH groups in cysteins in protein molecules.

As a result of our extensive studies in search of such a reagent as to couple specifically with the thiols, one of the most physiologically important functional groups in proteins, we have now found that the purpose can be achieved by the use of N-substituted aminonaphthylmaleimides, thus accomplishing the present invention.

The N-substituted aminonaphthylmaleimides which may be used in the present invention can be prepared by cyclizing these maleic acid compounds obtained by condensing primary amines bearing naphthylamine such as anilinonaphthylamine or dialkylnaphthylamines with maleic anhydride. Referring to N-(1-anilinonaphthyl-4) maleimide as an example, this compound obtained after recrystallization from ethyl acetate forms red angular pillar-shaped crystals having a melting point of from 207°C to 208°C and analyzed as follows (as $C_{20}H_{14}N_2O_2$):

|  | C | H | N |
|---|---|---|---|
| Calcd. | 76.42 | 4.49 | 8.91 |
| Found | 76.39 | 4.37 | 8.95 |

The N-substituted aminonaphthylmaleimides according to the present invention react selectively with thiols at the maleimide group in the reagent molecules. Although the N-substituted aminonaphthylmaleimides do not fluoresce themselves, the addition products resulting from the reaction with thiol groups are highly fluorescent and undergo a shift of fluorescence wavelengths and intensities in the fluorescence spectra by being sensitively affected by physico-chemical environmental conditions around biopolymers, for example, by the polarity of the medium. Thus these reagents may serve as a unique reagent utilizable, in a wide variety of fields including fundamental biochemistry, medical studies and clinical diagnosis, for micro-quantitative analysis of varied thiol compounds which play extremely important biological foles in the living body, or as a specific reporter reagent or a probe to provide informations as to the distribution of enzymes or other biopolymers in cells, tissues or organs as well as to the high dimensional structures and "hydrophobicity" of such biopolymers.

The present invention will be further illustrated by the following example wherein N-(1-anilinonaphthyl-4) maleimide is taken as an example of the reagent of this type.

1.2 grams of maleic anhydride is dissolved in 10 ml of chloroform and stirred with ice cooling. To this solution is added a solution of 2.3 grams of 1-anilino-4-aminonaphthalene in 40 ml of chloroform, which results, after a while, in precipitation of red crystals, which are, after being allowed to stand cold overnight, collected by filteration.

The resultant N-(1-anilinonaphthyl-4) maleamic acid is mixed with 10 ml of acetic anhydride and 1 gram of anhydrous sodium acetate and heated in an oil bath at 110°C until complete dissolution (3 or 4 minutes) followed by heating for further several minutes, whereafter the mixture is poured into ice-water and neutralized with sodium bicarbonate to precipitate crystals which are then collected by filtration.

The resultant crystals are subjected to chromatography on silica gel using dichloroethane and then recrystallized from ethyl acetate to obtain the N-(1-anilinonaphthyl-4) maleimide as red angular pillar-shaped crystals having a melting point of 208°C. Yield is about 0.8 gram.

Using such a thiol-group detecting reagent as the thus obtained N-(1-anilinonaphthyl-4) maleimide, the following detection test was carried out.

Thus, 1 mole of N-(1-anilinonaphthyl-4) maleimide prepared as above and 4 moles of a protein sample are admixed in a phosphate buffer (pH 6.85) and incubated for one minute, and 50-folds volume of mercaptoethanol added thereto to discontinue the reaction followed by making dialysis over-night against the same phosphate buffer. Subsequent measurement for absorbance and fluorescence confirms the presence of thiol groups. This detection procedure is based upon the fact that only the addition product of the anilinonaphthylmaleimide with the thiol compounds in the sample emit fluorescence. That only the addition product of the type as described above emit fluorescence will become more evident by the following test.

Thus, a mixture of 0.1 ml of a $10^{-6}$ to $10^{-5}$ M solution of a thiol compound and 0.5 ml of a 0.4 M phosphate buffer (pH 6.85) is cooled to 0°C and $10\mu l$ of a $10^{-4}$ M solution of N-(1-anilinonaphthyl-4) maleimide is added. After a period of 40 minutes, the mixture is made up to 2.5 ml by addition of water in preparation for measurement of fluorescence intensity at 25°C. Although the above meleimide itself does not fluoresce, after the treatment with a thiol compound such as N-acetylcystein, is found to emit intense fluorescence. In this case, the exciting wavelength is 345 nm and the fluorescence maximum wavelength is 505 nm (in an aqueous solution) or 445 nm (in an ethanolic solution). Thus, as illustrated with N-(1-anilinonaphthyl-4) maleimide, although anilinonaphthylmaleimides them- Table I

| Maximum wavelength, nm | Fluorescence maximum wavelengths | | | | |
|---|---|---|---|---|---|
| | 505 | 455 | 445 | 440 | 425 |
| Solvent | Water | Methanol | Ethanol | Isopropanol | Chloroform |
| Z value | 95 | 84 | 80 | 76 | 73 |

Table II

| Intensity ratio | Fluorescence intensity ratios | | | |
|---|---|---|---|---|
| | 1 | 20 | 50 | 100 |
| Solvent | Water | 30% Ethanol | 60% Ethanol | Ethanol |
| Z value | 95 | 90 | 85 | 80 |

Note: Z is Kosower's index representing the polarity or ionizability of the solvent.

selves do not emit fluorescence, their addition products with the thiol compounds emit intense fluorescence.

Referring now to the fluorescence characteristics of the addition product between the anilinonaphthyl-maleimide and thiol compounds, the fluorescent spectra of the addition products vary depending upon the medium, that is, the decreasing polarity of the medium result in shift of the maximum wavelengths towards blue with attendent increase in fluorescence intensity while the increasing polarity of the medium results in shift of the maximum wavelengths towards red with accompanying reduction in fluorescence intensities.

To clarify this relationship, the fluorescence maximum wavelengths and fluorescence intensity ratios of the addition product between the N-(1-anilinonaphthyl-4) maleimide and a thiol compound (N-acetylcysteine) in solvents of different polarities are shown in the following tables.

In this connection, the polarity near the thiol groups in proteins such as egg albumin or bovine serum albumin was measured with the use of N-(1-anilinonaphthyl-4) maleimide to give Z values of 74 to 80 and 60 to 65, respectively. It has been known that various anilinonaphthalene derivatives such as naphthalenesulfonates have very similar spectroscopic properties. Therefore, the above results with N-(1-anilinonaphthyl-4) maleimide are well to hold for other anilinonaphthylmaleimides. Owing to this remarkable solvent-dependency of the fluorescent characteristics, anilinonaphthylmaleimides are expected to be useful fluorescent hydrophobic probes directed to thiol groups in protein.

What is claimed is:

1. A thiol-group detecting reagent consisting of N-(1-anilinonaphthyl-4)maleimide.

* * * * *